June 2, 1964  G. H. MORRIS  3,135,337
DUPLEX ROTARY ROD WEEDER
Filed March 9, 1960  8 Sheets-Sheet 2
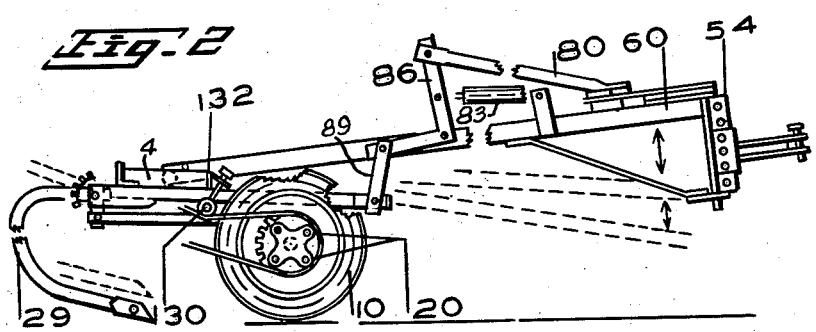
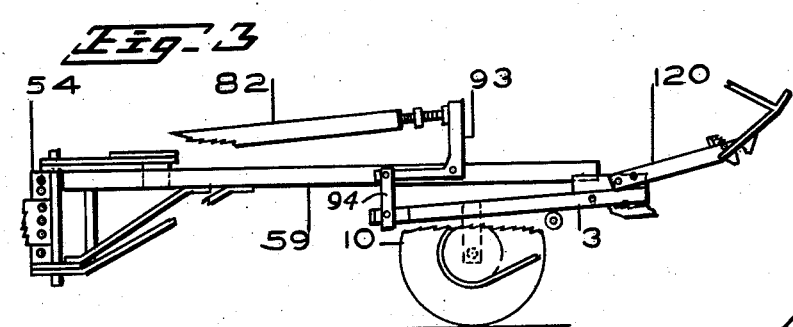
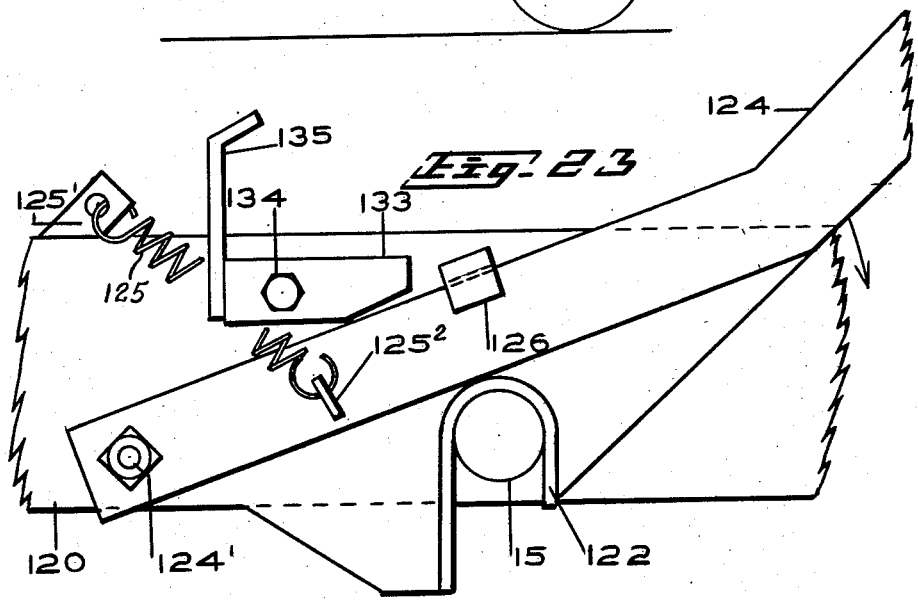

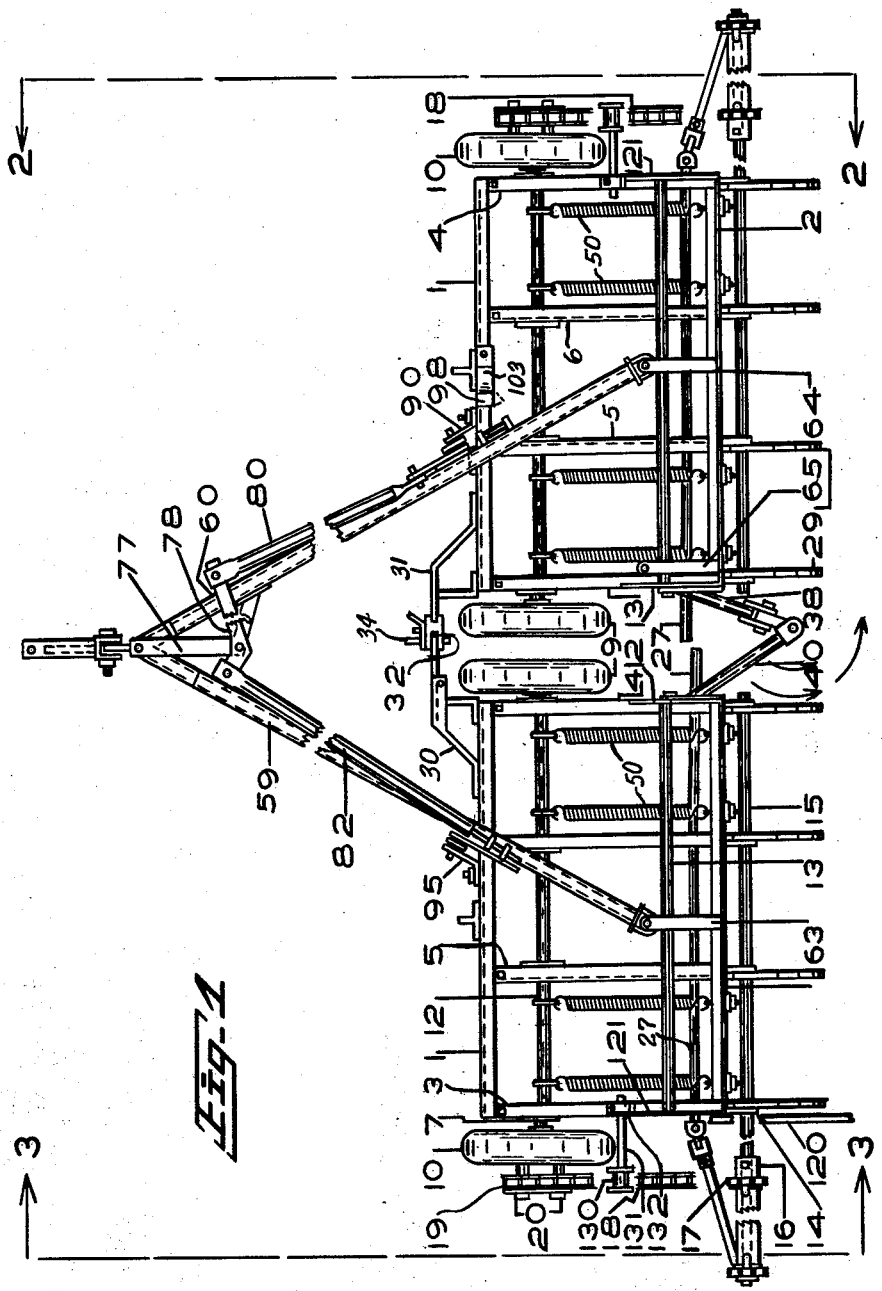

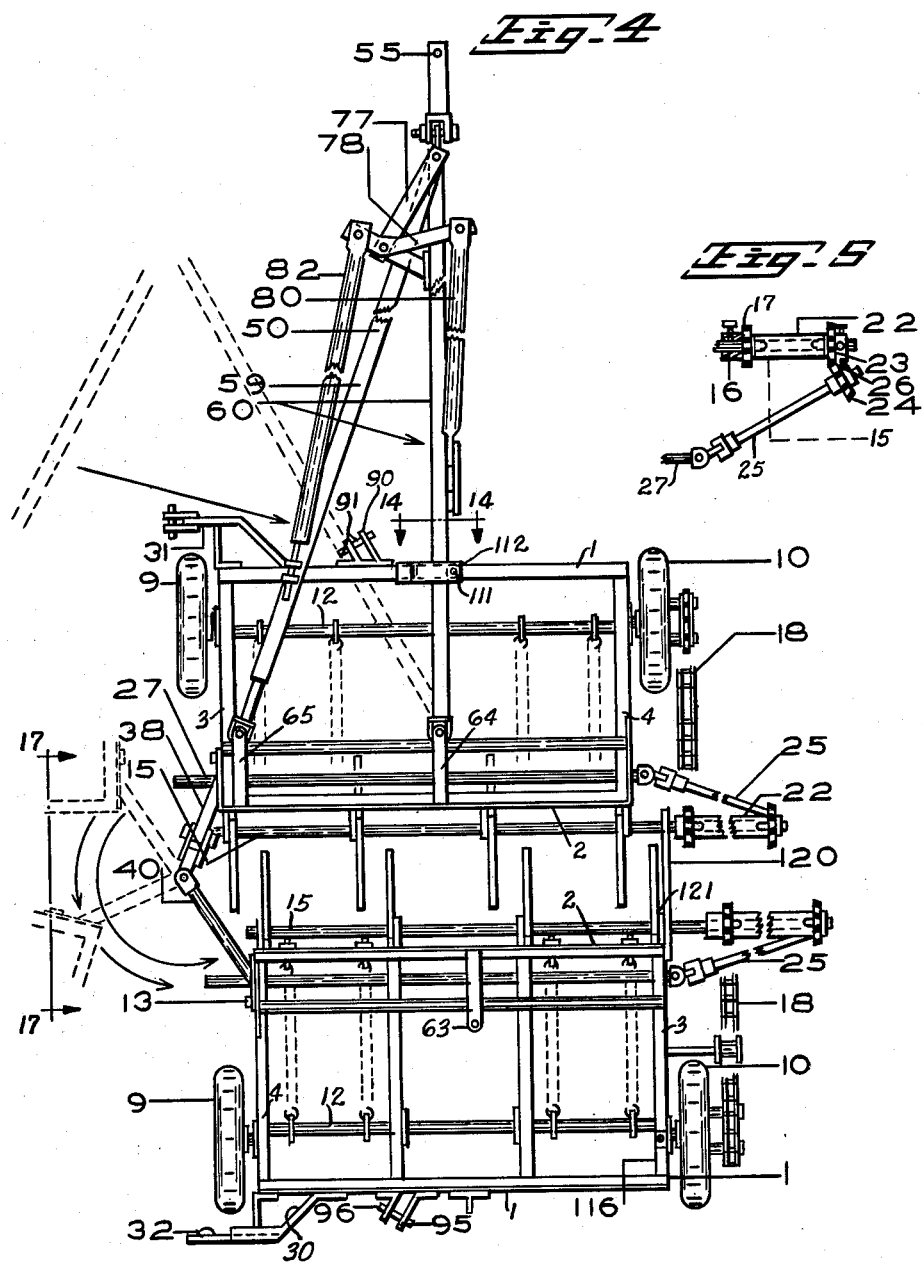

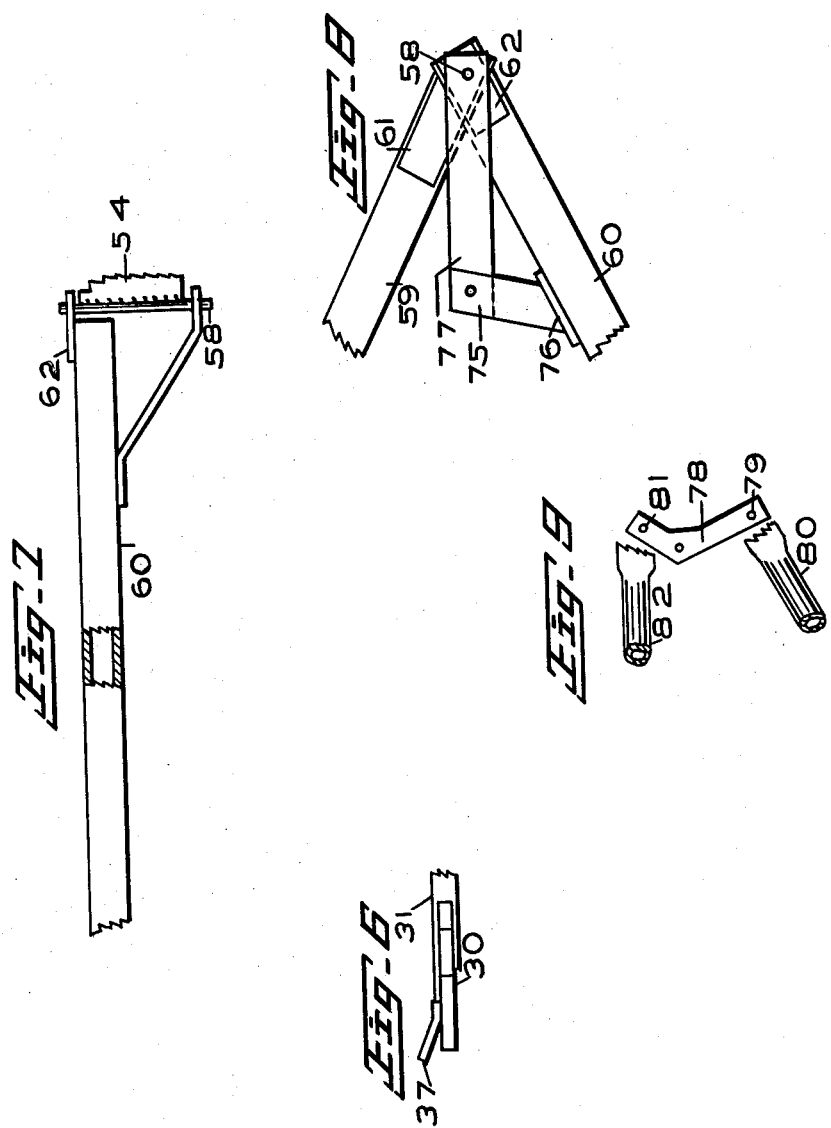

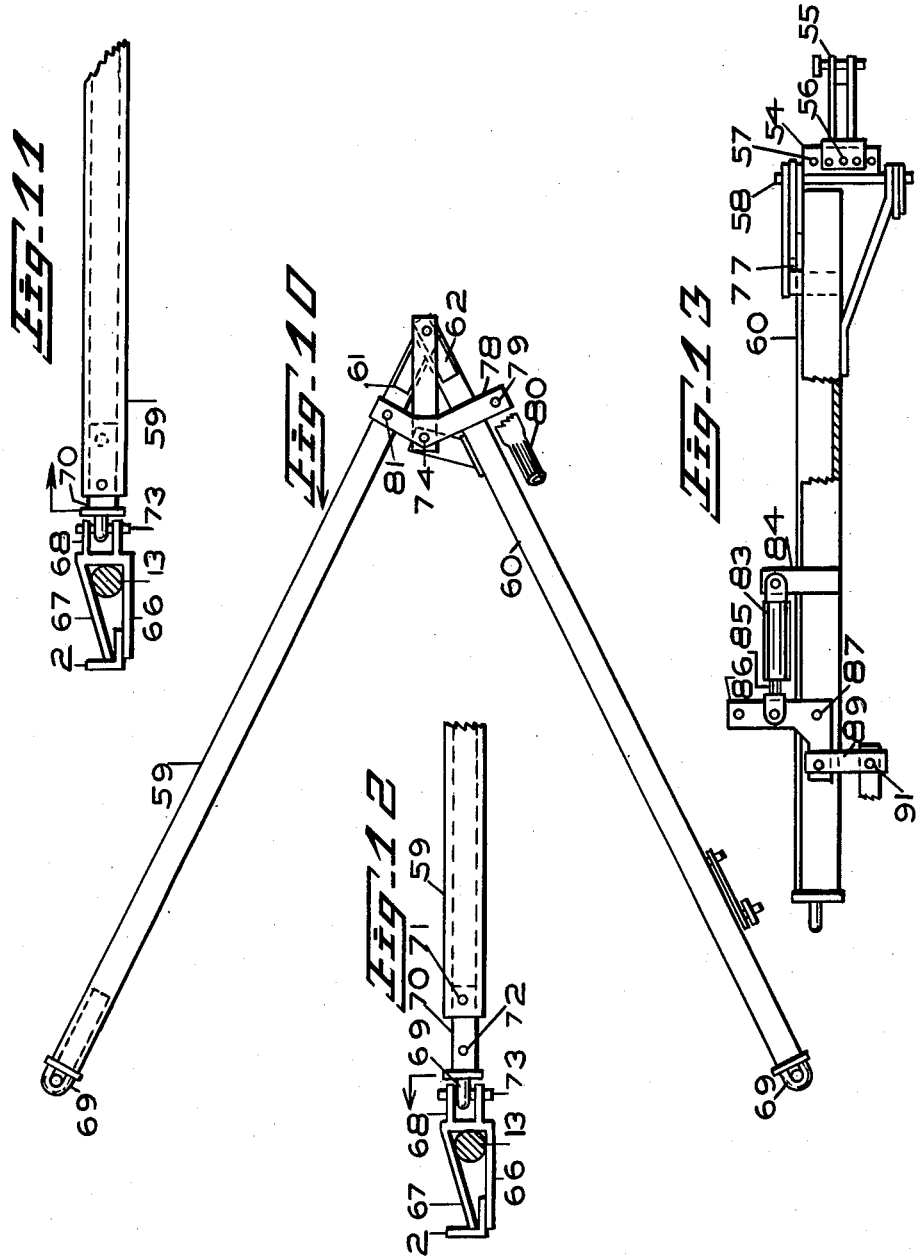

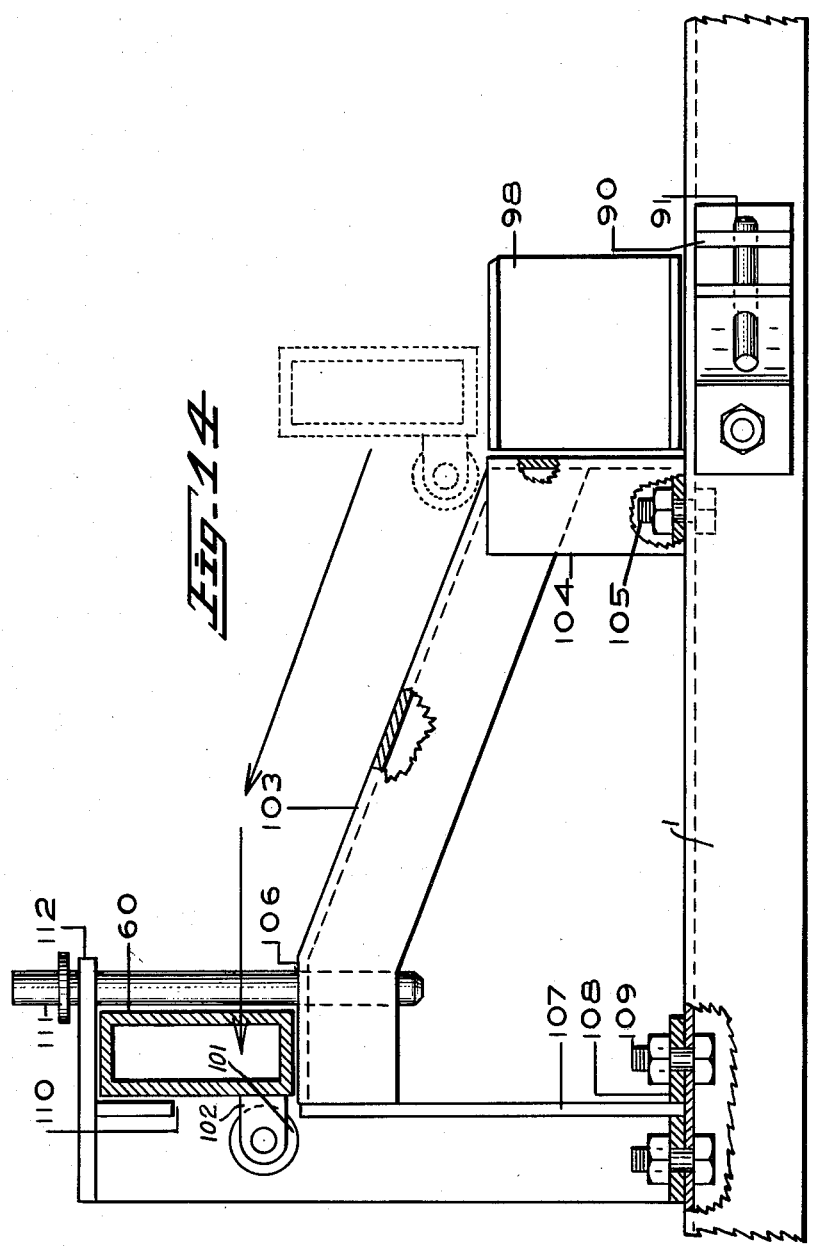

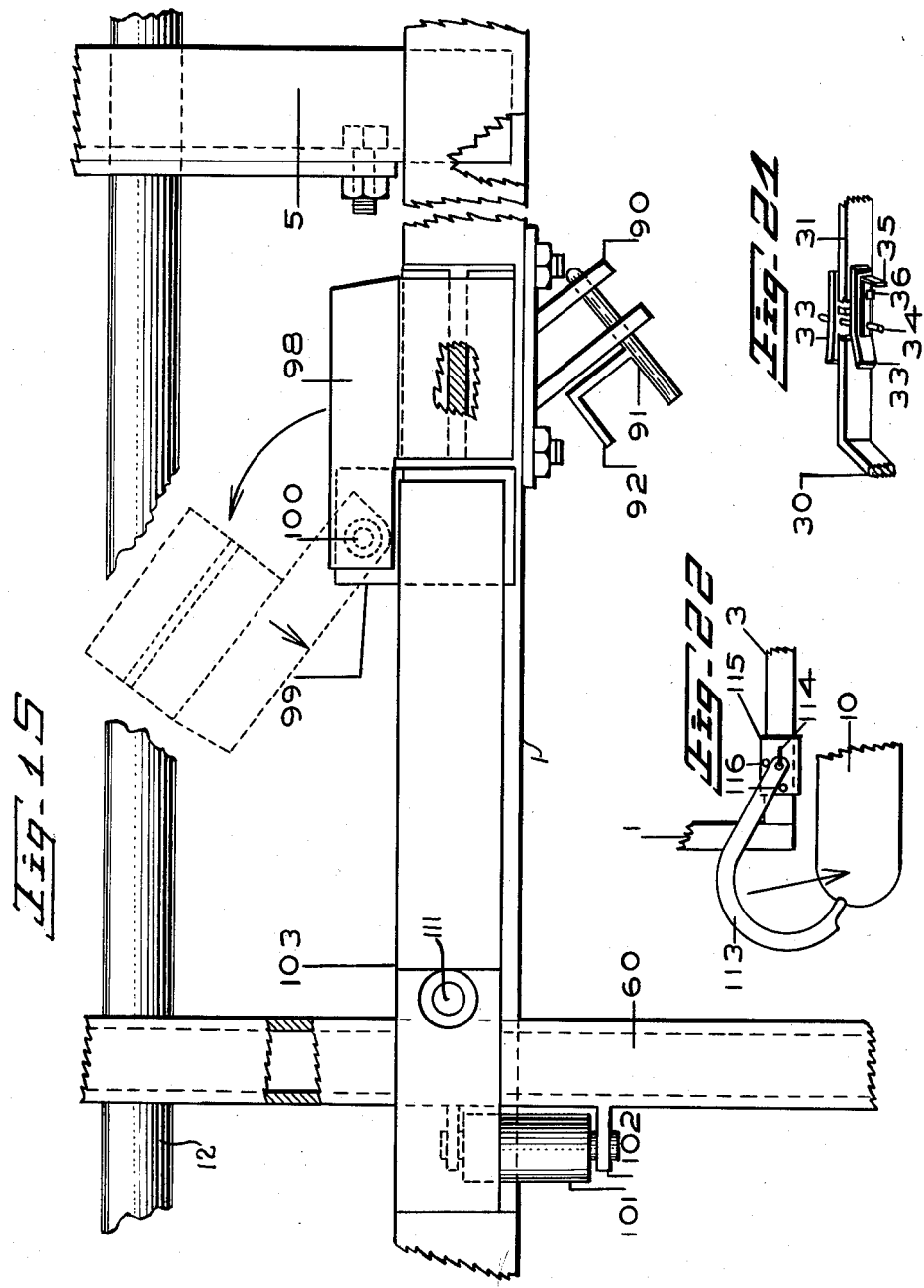

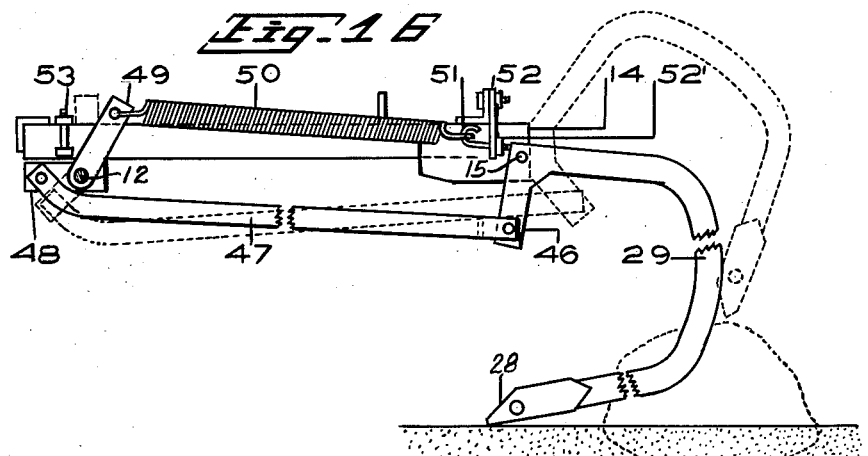
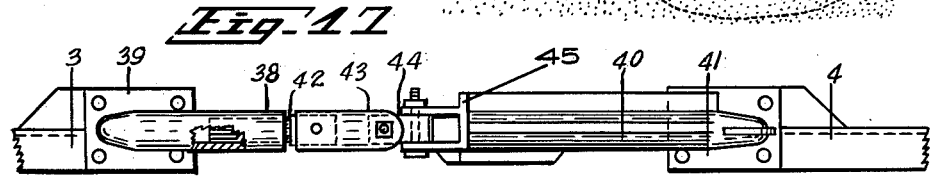
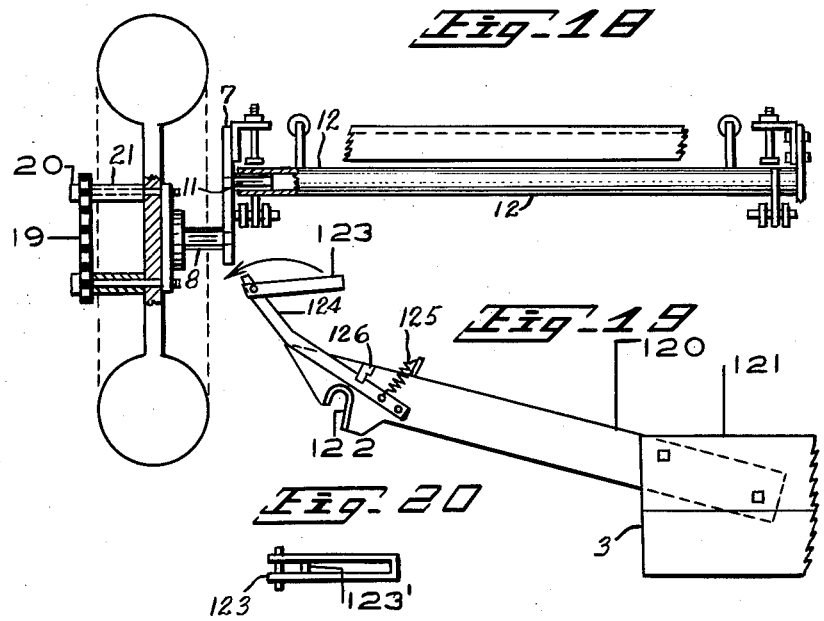

United States Patent Office 3,135,337
Patented June 2, 1964

3,135,337
DUPLEX ROTARY ROD WEEDER
George Henry Morris, Yorkton, Saskatchewan, Canada
Filed Mar. 9, 1960, Ser. No. 20,234
6 Claims. (Cl. 172—44)

This invention relates to soil cultivating implements, and in particular has reference to rotary rod weeders.

In farming, to meet the requirements of larger tractors and bigger operations implements of greater width working a wider strip of ground than was formerly practical are required, particularly in cultivating implements in which an implement of a normal width is much too small, and due to the difficulties in travel of the implement on roads of restricted width, such an implement may not be made wider than a single unit.

The present invention is concerned with provision of an implement, designed as a rotary rod weeder, and made up of two sections connected for working in line and adapted to be shifted to a position in tandem for travel of the implement. The device includes improved elements between the implement sections by which they may be readily connected either for working or for travel of the implement. A novel hitch connection for the implement is also provided engageable with the implement sections when aligned in working position and adjustable to engage the sections in following relation the one to the other for travel of the implement. Improved driving means for the rotary rods of the weeder are provided and improved mountings for the rod carrying shanks of the weeder by which when an individual rod carrying element encounters an obstruction in the ground the remaining elements in the same section may rise correspondingly in clearing the obstruction.

Other improvements and advantages of the device will become apparent by reference to the accompanying description taken in conjunction with the drawings.

In the drawings, illustrating a preferred embodiment of the invention,

FIG. 1 is a top plan view of an implement in the form of a rotary rod weeder, made up of two sections and embodying my improvements, the sections being shown in line and parts of the implement being shown as broken away.

FIG. 2 is an end view taken as viewed from a line 2—2 of FIGURE 1, shown broken away in part and with parts omitted, and further illustrating movement of the implement sections when tilted to raise the rod carrying shanks and showing the tilting mechanism for the right section.

FIG. 3 is a view of the implement taken as viewed from a line 3—3 of FIGURE 1, showing the implement tilting connecting mechanism for the left section, parts being omitted and parts broken away.

FIG. 4 is a top plan view of the implement shown with the sections connected, the one behind the other, for travel of the implement, parts being shown as broken away and parts omitted, and the movement of the implement sections between positions in line and in tandem being indicated partly in phantom.

FIG. 5 is a detail top plan view of connecting elements for driving a weeder rod.

FIG. 6 shows an enlarged view of a fragment of the connecting bracket joining the fronts of the sections when the sections are in line.

FIG. 7 is an enlarged side view of a fragment of draft bar and hitch connection, shown in part as broken away and in part sectioned.

FIG. 8 is an enlarged top plan view of a fragment of the draft bars and forward connecting elements.

FIG. 9 is a detail enlarged top plan view showing fragments of the link bars for operation of the tilting mechanism for the implement sections and including the angled bracket to which they connect.

FIG. 10 shows an enlarged top plan view of the draft bars and forward connecting elements for the bars, and showing in relation thereto a fragment of a tilting mechanism link bar.

FIG. 11 shows an enlarged side view of a fragment of the left draft bar and elements connecting the bar to the implement frame.

FIG. 12 shows a view similar to that of FIGURE 11, but with the telescopic link connection for the draft bar extended.

FIG. 13 shows an enlarged side view, taken from the outside, of the right draft bar, including the hitch connection and the hydraulic tilting mechanism, shown broken away in part.

FIG. 14 is an enlarged front view taken from the line 14—14 of FIGURE 4 of a fragment of the front frame bar and the elevating attachment for the right draft bar, including an end view of the latter in section and with parts broken away and in section, and further indicating travel of the draft bar to its elevated position on the frame.

FIG. 15 is an enlarged top plan view of the parts shown in FIGURE 14 and including the rocker shaft, the position of the draft bar supporting block when not in use being indicated in dashed lines, shown in part broken away and in part as sectioned.

FIG. 16 is an enlarged side elevation of a weeder rod carrying shank and mounting for the shank, and including parts of the implement frame, showing the movement of the shank in phantom while avoiding an obstruction in the ground.

FIG. 17 is an enlarged rear side view of the pivotal connecting links between the sections viewed from the line 17—17 of FIGURE 4, including fragments of the section frame bars to which the links attach, shown in part broken away and sectioned.

FIG. 18 is an enlarged side view showing the mounting of a wheel and including the driving connection on the wheel for a weeder rod, and further including the rocker shaft and frame elements, shown in part as broken away.

FIG. 19 is an enlarged side view of a locking bar for securing the left implement section in following relation to the right section for travel of the machine, and including a fragment of the frame and the attaching plate.

FIG. 20 is an enlarged top view of the lever arm for the extension of the locking bar.

FIG. 21 is a detail enlarged perspective broken away of the connecting parts of the front locking brackets shown with the brackets connected, as in FIGURE 1.

FIG. 22 is a rear view of the left outside corner of the frame and wheel, showing a locking hook for engagement of the wheel, shown broken away.

FIG. 23 is an enlarged side view broken away of the locking bar for connection of the sections for travel, including a fragment of the left section outer frame side bar.

Having reference to the drawings, right and left weeder sections are provided to be connected in line for working purposes, as shown in FIGURE 1, and in following relation, the one behind the other as shown in FIGURE 4, for travel. The two sections are similar and like numerals will indicate like parts in both sections.

Each section has a frame formed of front and rear cross bars 1 and 2, end bars 3 and 4, and intermediate connecting bars 5 and 6. To the end bars attach depending plates 7, FIGURE 18, carrying stub axles 8 mounting an inner wheel 9 and outer wheel 10 (FIG. 1).

The plates 7 have fixed thereto inwardly projecting studs 11 (FIG. 18) mounting to turn thereon a tubular rocker shaft 12. Intermediately in the frame a further tubular shaft 13 (FIG. 1) is mounted fixed, as by welding, to plates 121 attached to the end frame bars 3 and 4.

To the end frame bars 3 and 4, and connecting bars 5, are attached plates 14 in which is carried, free to turn, a gangshaft 15 (FIG. 1). On an outer end of the shaft 15 is a sleeve 22 (FIG. 5) bearing at the inner end against a collar 16 and carrying a sprocket 17 fixed thereto. This sprocket is connected to be driven by a chain 18 (FIG. 1) trained over the sprocket and a further sprocket 19 attached by bolts 20 on the hub of the outer wheel 10. Four such bolts are used and the sprocket is spaced outwardly of the hub by spacers 21 (FIG. 18) integral on the sprocket 19.

A tightener for the chain 18 consists of a roller 130 (FIG. 1) on an axle 131 attached by a bracket 132 to the bar 3.

On the outer end of the sleeve 22 (FIG. 5) is fixed a bevel gear 23 held in driving relation to a bevel gear 24 on a drive shaft 25 by a bracket 26 carried on the shafts 15 and 25. The shaft 25 connects by a universal coupling to a weeder rod 27 mounted rotatable in shoes 28 (FIG. 16) secured to a series of shanks 29 attached, as by welding, on the gangshaft 15.

For connection of the two weeder sections in line brackets 30 and 31 (FIGS. 1, 4 and 6) are attached to the front frame cross bars 1 connectable by an end 32 of the bracket 30 engaging a clevis formed by plates 33 (FIG. 21) secured on the bracket 31 and the parts secured by a pin 34. The parts are also locked by a clamp 35 attached to the pin and engageable in a recess formed between a lug 36 and the end of the bracket 31. To this would be added a guide plate 37 (FIG. 6) on the top of the bracket aligning the meeting ends of the brackets when connecting the sections together.

Rearwardly, the frame sections are connected by a tubular bar 38 (FIG. 1, 4 and 17) attached by a plate 39 to the frame bar 3 of the right section and a tubular bar 40 secured by a plate 41 on the bar 4 of the left section. In the bar 40 is secured a rod 42 on the outer end of which is attached a sleeve coupling 43 having a forked end pivotally attaching to a joint block 44 that is pivotally engaged by a yoke 45 permitting the yoke and coupling to pivot sidewise and up and down.

In FIGURE 16 is shown the mounting of one of the rod carrying shanks 29, all of which are similarly mounted securely attached on the gangshaft 15. The shank 29 has a depending arm 46 at its attaching end and this arm connects by a strap 47 to one end 48 of an arm fixed to the rocker shaft 12, the other end 49 of which arm engages one end of a coiled spring 50 that is attached by a hook bolt 51 to a depending plate 52 secured on the rear cross bar 2 by a nut 52'. The tension of these springs is adjustable by bolts 53 threaded in the frame end bars bearing against the arms 48.

The draft connection for the implement consists of a hitch plate 54 (FIG. 13) to which is attachable a clevis 55 by bolts at 56 and vertically adjustable by provision of extra holes, as at 57, in the plate 54. To the rear edge of the hitch plate is welded a rod 58 and pivotally engaged on this rod are tubular draft bars 59 and 60 (FIGS. 8 and 10), the bar 59 connecting by a plate 61 and the bar 60 by a plate 62.

The inner ends of the draft bars attach to the rear frame cross bar 2 by one or other of three brackets 63, 64 and 65 (FIGS. 1 and 4), the bracket 63 attaching on the cross bar of the left section and the brackets 64 and 65 on the right.

Each of these brackets (FIGS. 11 and 12) consists of a lower plate 66 fixed to the under side of the cross bar 2 and an upper inclined plate 67 fixed to the upper side of the horizontal wing of the cross bar. Integral with these plates is a U bracket element 68 in which is engageable an eye 69 of a draft bar to be connected by a pin 73.

The draft bar 60 has the eye 69 fixed to the one end of the bar, but for the draft bar 59 the eye is integral with a rod 70 endwise slidable in the draft bar and engageable by a pin 71 insertable through a suitable opening in the draft bar by one or other of two openings 72 in the rod 70, permitting extension of the draft bar for engagement of the bracket 63 on the left section and shortening of the bar for engagement of the bracket 65 on the right section, as apparent by reference to FIGURE 4.

Pivoted on a pin 74 (FIGS. 8 and 10) on a bracket formed by a plate 75 attached by a plate 76 to the draft bar 60 and a plate 77 attached on the rod 58 is a bent arm 78 to which pivots at 79 a tubular tilting link 80, and to the other end of which pivots at 81 a tubular tilting link 82.

For tilting the right section of the implement on the stub axles 8 to raise the shanks 29 and weeder rod 27 a hydraulic lift 83 (FIG. 13) operated by a supply of fluid under pressure from the tractor in following relation to which the implement is drawn. This lift attaches to an upright arm 84 fixed to the draft bar 60, and the piston rod 85 of the hydraulic lift intermediately attaches to the upright end of a crank arm 86 pivoted at 87 on the draft bar, the upper end of this crank arm having the link 80 pivoted thereto.

The other end of the crank arm is pivotally connected by a link 89 to a bracket 90 (FIGS. 14 and 15) fixed to the front cross bar 1 of the section, engaged by a pin 91 with the handle 92 of the pin (FIG. 15) provided for its insertion and removal.

To simultaneously tilt the left frame section downward the tubular link 82 (FIG. 3) has a screw threaded attachment to the one arm of a crank arm 93 pivoted on the draft bar 59, and to the other end of this crank arm pivotally attaches a link 94 that is pivotally connected by a bracket 95 (FIG. 4, lower section) and pin 96 to the left secton of front cross bar 1.

To change the weeder to transport position, shown in FIGURE 4, from the position in line shown in FIGURE 1, the sections must first be pivoted on the wheel axles, depressing the front of the sections downward more than half way and correspondingly raising the shanks 29. This is done by the hydraulic lift 83 (FIG. 13) actuating the crank arm 86, the lower end of which arm attaches to the front cross bar of the right weeder section through the link 89 and bracket 90 (FIGS. 1, 2 and 3), secured by the pin 91, as apparent by reference to FIGURES 2, 14 and 15. At the same time the crank arm 86 through the link 80, arm 78 and link 82 actuates the crank arm 93 that connects by link 94 (FIGS. 3 and 1) to the bracket 95 on the frame cross bar 1 of the left section by the pin 96, and this depresses the forward end of the left section.

It is necessary then to provide means for securing the sections forwardly tilted downward and this is shown in FIGURES 14 and 15.

On the front cross bar of the right section is pivotally attached a block 98 (FIGS. 14 and 15) by an arm 99 engaging a bolt 100. This block is normally swung out of the way, but when the frame sections are tilted downward the block may be swung back between the bar 60 and frame bar 1 for supporting the draft bar.

On the draft bar 60 is a roller 101 mounted in brackets 102 and adapted for travel up the inclined runway 103 supported at the lower end by an upright arm 104 secured by a bolt 105 to the frame bar 1. This runway has a horizontal section 106 at the upper end portion, and at the extreme end is attached, as by welding, to an angle iron upright 107 that has a flat portion 108 attached by bolts 109 to the frame bar 1. The one wing of the angle iron upright 107 has an opening 110 in which the roller 101 is receivable when the draft bar 60 has been moved to the upper end of the runway, and the draft bar is secured in place by a pin 111 engaging in a suitable opening in a plate 112 fixed to the upper end of the upright 107 and an aligned opening in the runway.

The block 98 is drawn back into the position shown by dashed lines in FIGURE 15 when not in use. When tilting the sections this block is moved into a position above the frame bar 1 and provides a support for the bar 60 when starting up the runway 103, as shown in FIGURE 14.

With the block 98 in position to support the draft bar 60 the elevating mechanism for the left section may be disconnected. The connecting pin 96 (FIG. 4) for the left section elevating mechanism is removed and the link 94 turned back out of the way, and the pin 91 connecting the link 89 to the right section bracket 90 is also removed. The pin 73 (FIGS. 11 and 12) is then taken out, disengaging the draft bar 59 from the bracket 63 and this draft bar is swung over to the right frame section for engagement with the bracket 65, for which the draft bar is shortened by the rod 70 and pin 71.

The pin 111 is then removed, FIGS. 14 and 15, and a brake hook 113 (FIG. 22), pivotally attached by a staple 114 on a plate 115 on the left section end bar 3, is moved into engaging position around the front of the tire of the outer wheel 10 and is set between spaced studs 116 on the plate 115 when not engaged.

The tractor to which the implement attaches is next driven forward and to the right, causing the right draft bar 60 to roll up the runway 103, (FIG. 14) and the pin is inserted to hold the draft bar in place. The left draft bar 59 is then engaged with the bracket 65.

The pin 34 connecting brackets 30 and 31 (FIGS. 1 and 21) is next removed and the tractor continues forward, turning to the right, until the left section is at an angle of ninety degrees or more with the right section and the tractor is then put in reverse, which brings the left section into position behind and parallel with the right section. In this the left section swings over and to the rear of the right section, allowing the shanks to bypass those of the right section without extending further back than necessary.

For securing the sections together a locking bar 120 (FIGS. 19, 20 and 23) is attached on a plate 121 fixed to the outer side of the left section end bar 3. The locking bar includes a notch 122 engageable with the gankshaft 15 at the outer side of the right frame section. When it is required to disengage the locking bar a lever arm 124 is used. This lever arm is pivoted to the locking bar at 124' and is normally held engaged by a stud 126 on the locking bar by a spring 125, the spring attaching by a plate 125' to the section frame bar 3 and by a lug 125² to the arm 124. Pivoted on the end of the lever arm is a hand grip 123, this hand grip forming an extension of the lever arm for extra leverage by turning the hand grip back in the direction of the arrow until a stud 123' comes into contact with the under side of the lever arm.

On the frame bar 3 is pivoted a latch 133 on a pin 134, this latch including a hand grip 135 and being adapted to be moved down into a depending position engaged on the arm 124, as indicated in FIGURE 23, when the lever arm has been pressed down fulcrumed on the gang shaft 15 to raise the section so that the notch 122 in the locking bar may be disengaged from the gang shaft.

To change the weeder sections into line again the locking bar is disengaged and the brake hook 113 is then engaged on the rear of the left outer tire, and the tractor is driven forward swinging to the left until both sections are in line and the front brackets 30 and 31 may be reengaged.

The pin 73 (FIGS. 11 and 12) is then removed and the draft bar is moved back again to the left frame section and the pin 71 removed to permit the necessary adjustment being made to the length of the draft bar. The pin 73 is then engaged through the U element 68 and eye 69. The pin 111 (FIGS. 14 and 15) is next removed and the tractor swung to the left bringing the draft bar 60 back down the inclined runway 103, when the pins 111 and 71 can be replaced. Next the link 94 is reengaged with the bracket 95 on the left section by the pin 96, and the link 89 of the right section is engaged again with the bracket 90 by the pin 91.

By means of the hydraulic cylinder the forward end of the frame sections can be depressed, releasing the block 98, and the block is then turned aside, as in FIGURE 15. The weeder is then ready to be tilted back into working position.

The weeder is well balanced in both the operating and transport positions, requiring a minimum effort to raise or lower the forward end for attachment to the tractor.

The rear pivot assembly, made up of the bars 38 and 44 (FIGS. 4 and 17) and their connecting parts, is designed to permit the two sections to pivot to conform with the unevenness of the ground, the assembly on the right section being free to rotate. The left section is longer than the right assembly section in order to have the pivot between the assembly bars properly located so that the two sections may come close together when connected for travel, in which position the rod carrying shanks 29 of the left section are to the right of the shanks of the right section. The point of pivotal connection between the bars 38 and 40 must be such that the shanks of the left section may bypass the shanks of the right section without extending farther back than necessary when the sections are shifted from a position in line to one in tandem to be engaged for travel.

The fore and aft pivot couplings only permit a movement between the sections when in line that allows the outer ends of the weeder to fall below or rise above the center, but without permitting one section to get out of line with the other.

The weeder is equipped with an automatic trip device, using the heavy coiled springs 50 (FIG. 16) attached to the arms 49 that are fixed to the rocker shaft, the other ends of the springs attaching to the rear frame cross bars.

The tension of the springs 50 holds the horizontal arms 48 against the adjusting bolts 53. The connecting straps 47 in turn hold the shanks 29 in a forward locked position. When any of the shanks in a section come into contact with obstructions, as in FIGURE 16, sufficiently solid to cause enough tension on the springs to unlock the trip, then the whole set of shanks and the weeding rod of the section swing back and upward until the obstruction is cleared and then return to their working position.

In the use of the weeder, the weeder sections are connected in line, as shown in FIGURE 1, for working the ground, and moved into the positions shown in FIGURE 4 for travel.

To change from a working position to a position for travel the weeder sections are first tilted forwardly downward to raise the rod carrying shanks 29. For this the hydraulic lift 83 is used. This, as shown in FIGURES 13 and 2, pushes forward on the upper arm of the crank 86, which moves the horizontal arm of the crank downward and by the link 89, which connects to the frame bar 1 of the right section, the section is tilted downward.

As will be seen by reference to FIGURE 2, the crank 86 has the link 80 connecting the crank to the bracket 78 (FIG. 10) and this bracket is pivoted at 74 and connected by the link 82 (FIG. 3) to the upper arm of the crank 93 that is pivoted on the draft bar 59. The crank 93 is mounted reversed relative to the crank 86 and the forward movement imparted to the crank 93 pivots the crank forward. This crank connects to the frame bar 3 of the left section and tilts this section downward corresponding to the tilting of the right section.

The two sections are connected rearwardly by the arms 38 and 40. These arms are rigidly fixed to the inner frame end bars 3 and 4, and consequently the two weeder sections are held against tilting forward or backward in relation to each other but only as a unit. They are pivotally connected to the block 44, as shown in FIGURE 17 up and down sidewise in relation to each other, or forward and backward on a common level, but are held by the rigidly attached arms 38 and 40 for tilting backward and forward only as a unit.

With the sections tilted the block 98 is moved into the position shown in FIGURE 14 on the frame bar 1. The connecting pin 96 for the left section is then removed and the pin 91 for the right section. The drfat bar 59 is disconnected and moved over to the right section where it is engaged with the bracket 65. The brake hook 113 is then engaged with the front of the tire of the outer left section wheel 10.

To move the sections into position in line for travel the tractor hauling the weeder is moved to the right rolling the draft bar 60 up the runway 103 and the pin 111 (FIG. 14) is inserted to hold the draft bar. The pin 34 connecting the brackets 30 and 31 is next removed and the right section is swung around by the tractor into position in back to back relation with the left section, as in FIGURE 4, when the locking bar 12 may be engaged with the gang shaft 15. The implement is then ready for travel.

To return to the working position of the sections the locking bar is disengaged and the above procedure reversed.

Having thus particularly described and ascertained the nature of my said invention, what I claim and wish to secure by Letters Patent is:

1. In a rotary rod weeder made up of two sections each having a frame and wheels supporting the frame, and including a gangshaft in each section and shanks mounted on the gangshaft, said shanks carrying soil working elements and further including a draft bar for each section pivoted thereto, a bracket forwardly mounted on each section, detachable means on the brackets engageable the one with the other for connecting the sections for travel in line abreast, a crank arm pivoted on each draft bar to move vertically, links connecting the crank arms to the section frames for pivoting said frames on the supporting wheels by vertical movement of the crank arms, means connecting the crank arms for movement thereof in a common direction, a bar fixed to the inner end of each section rearwardly extending, coupling means joining the rear ends of the bars to pivot sidewise and vertically, and a locking bar fixed to the outer end of the one section projecting rearwardly, said locking bar inclining upward and having a notch on the outer under side thereof engageable with the gangshaft of the other section when the section carrying the locking bar is brought into reversed following relation to the other section, and said sections have been pivoted forwardly downward.

2. A rotary rod weeder as set out in claim 1 in which the rearwardly projecting connecting bars are of unequal length to permit the soil working elements carried by the reversed section to be to one side of those of the other when the sections are moved into position with one section reversed in following relation to the other.

3. In a rotary rod weeder as set out in claim 1 means for securing the sections forwardly pivoted downward, said means consisting of a block pivotally mounted on the frame to swing horizontally and to be interposed between the draft bar for that frame and the frame when said frame is forwardly tilted downward, an inclined runway on the frame leading outwardly from the block and including an elevated horizontal section at the upper end of the runway, a roller on the draft bar for travel on the runway, and means for securing the draft bar on the elevated section of the runway.

4. In a rotary rod weeder made up of two sections connected for travel in line each having a wheel supported frame and including a draft assembly comprising a tractor hitch and a draft bar for each section pivotally attached to the hitch, each section having a bracket to which the draft bar for the section is pivotally attachable, means for forwardly tilting the sections downward on their supporting wheels, said means comprising a bent arm forwardly mounted intermediately pivoted on the draft bars to move horizontally, a crank arm forwardly pivoted on each draft bar to move vertically, said crank arms having horizontally extending end portions, the one of said end portions projecting forwardly and the other of said end portions projecting rearwardly, links pivotally connecting the crank arms to the bent arm by which endwise movement of one link moves the other link oppositely, further links detachable connecting the horizontally extending portions of the crank arms to the section frames forwardly thereon by which pivotal movement of the crank arms moves the sections tilted forwardly downward on their supporting wheels, and hydraulic means anchored to the frame and connected to move one of the crank arms and thereby tilt the sections as a unit.

5. A rotary rod weeder as set out in claim 4 in which the draft bar on the one section is detachable from the bracket thereof, and the other section includes a bracket to which the detachable draft bar is engageable, and said detachable draft bar is formed of two endwise adjustable parts and including means securing the parts together in one or other of the adjustable positions.

6. In a rotary rod weeder made up of two sections each having a frame and wheels supporting the frame and including soil working elements carried by the frames and a draft bar pivotally attached to each frame, means detachably forwardly connecting the sections in line free to pivot vertically relative to each other and detachable the one from the other, a crank arm vertically pivotally mounted on each draft bar, means pivotally connecting the crank arms to the section frames for pivoting the sections on their supporting wheels by vertical movement of the crank arms, means connecting the crank arms for movement in a common direction, and an assembly for pivotally connecting the sections rearwardly by which one section may be turned into reversed following relation to the other when said sections have been forwardly pivoted downward and hold the sections so pivoted, said assembly comprising a bar fixed to the one section rearwardly inclined, a further bar fixed to the other section rearwardly inclined, and means pivotally connecting the bars rearwardly of the sections to pivot up and down and sidewise, said means including a bar interposed between the fixed bars and to which the fixed bars attach the one to pivot horizontally and the other vertically thereon, said bars being of unequal length by which soil working elements of the reversed section may be to one side of the soil working elements of the other section when the one section is moved into reversed following relation to the other.

References Cited in the file of this patent
UNITED STATES PATENTS

| | | |
|---|---|---|
| 1,667,764 | Akers | May 1, 1928 |
| 2,139,200 | Moyer | Dec. 6, 1938 |
| 2,176,541 | Morris | Oct. 17, 1939 |
| 2,547,479 | Markel | Apr. 3, 1951 |
| 2,596,270 | Miller et al. | May 13, 1952 |
| 2,641,886 | Graham | June 16, 1953 |
| 2,767,631 | Mowbray | Oct. 23, 1956 |